United States Patent [19]

Moses

[11] Patent Number: 5,015,860

[45] Date of Patent: May 14, 1991

[54] SCINTILLATOR MATERIALS CONTAINING LANTHANUM FLUORIDES

[75] Inventor: William W. Moses, Berkeley, Calif.

[73] Assignee: University of California, Berkeley, Calif.

[21] Appl. No.: 503,784

[22] Filed: Apr. 3, 1990

[51] Int. Cl.$^5$ .................. G01T 1/202; C09K 11/85
[52] U.S. Cl. ................ 250/361 R; 250/363.02; 250/484.1; 252/301.4 H
[58] Field of Search .............. 250/361 R, 367, 370.11, 250/484.1 R, 362, 363.02; 252/301.4 H

[56] References Cited

U.S. PATENT DOCUMENTS 4,761,347 8/1988 Nakamura ............... 252/301.4 H
4,889,996 12/1984 Kotera et al. ............ 250/484.1 B

*Primary Examiner*—Edward P. Westin
*Assistant Examiner*—Richard Hanig
*Attorney, Agent, or Firm*—Roert J. Henry; C. Richard Pfeiffer; Berthold J. Weis

[57] ABSTRACT

An improved radiation detector containing a crystalline mixture of LaF$_3$ and CeF$_3$ as the scintillator element is disclosed. Scintillators made with from 25% to 99.5% LaF$_3$ and the remainder CeF$_3$ have been found to provide a balance of good stopping power, high light yield and short decay constant that is equal to or superior to other known scintillator materials, and which may be processed from natural starting materials containing both rare earth elements. The radiation detectors disclosed are favorably suited for use in general purpose detection and in positron emission tomography.

14 Claims, 2 Drawing Sheets

SCINTILLATOR MATERIALS CONTAINING LANTHANUM FLUORIDES

This invention was made with U.S. Government funding support under prime Contract No. DE-AC03-76SF00098, awarded by the United States Department of Energy. The U.S. Government has certain rights in the invention.

FIELD OF THE INVENTION

Scintillators are materials that emit flashes or pulses of light when they interact with ionizing radiation such as gamma rays. The present invention relates to ionizing radiation detection devices utilizing improved scintillating materials. More particularly, the present invention relates to the use of scintillators containing lanthanum fluoride mixed with cerium fluoride.

BACKGROUND OF THE INVENTION

High energy ionizing radiation such as gamma radiation cannot be detected directly; it must be converted into an electrical pulse. One common method for creating an electrical pulse when ionizing radiation is present is to first absorb the ionizing radiation in a scintillator. In response, the scintillator then produces a flash of light which is converted into an electrical signal by a photodetector.

Although the physical configuration of the scintillator/photodetector combination varies from application to application, the underlying principle remains constant. The scintillator will vary in size, but must be thick enough to stop the incident high energy radiation and large enough to cover the desired area. The exact type of radiation detector that the scintillator is coupled to varies but the radiation detector must produce an electrical signal large enough to be observable above background noise.

The effectiveness of this method of high energy radiation detection is primarily limited by the scintillating material. Only a few materials are known to scintillate, and the scintillation properties of these materials vary. An ideal scintillator would have a high density, a short decay time constant (i.e. the photons are emitted as soon as possible after the radiation interacts in the scintillator), and a large light output that is essentially proportional to the amount of high energy radiation deposited in the scintillator. High density is desirable in order to stop the ionizing radiation in as short a distance as possible, a short decay time is desirable in order to measure the time of interaction accurately, and a high light output is desirable in order to make it easier for the radiation detector to convert the light into an electrical pulse whose size indicates the amount of energy of radiation. In addition, the scintillating materials should not have unpleasant chemical or material properties, such as toxicity, hygroscopy, or extreme reactivity. Moreover, it is advantageous to utilize a material that is readily fabricated in crystal form.

The radiation detector that converts the scintillation light into an electrical pulse is usually either a photomultiplier tube or a solid-state (Si, GaAs, $HgI_2$, etc.) photodiode. A photomultiplier tube (PMT) is usually employed when very small amounts of radiation are to be detected, as a PMT converts each light into electrons with a gain of about 1 million. Photodiodes are usually used when large amounts of radiation are to be detected, as a photodiode typically converts light into electrons with unity gain. These radiation detectors can either be coupled to the scintillator either singly or in position sensitive arrays.

FIG. 1 diagrammatically demonstrates a single embodiment of a high energy radiation detector contemplated in the present invention. The device 10 is in the form of a hand held radiation monitor and is similar to a standard Geiger counter, but will be more sensitive to gamma radiation. A scintillator crystal 11 is optically coupled to a photomultiplier tube 12 and this assembly is encased in a opaque material 13 in order to shield ambient light. A cable 14 connects the scintillator/radiation detector assembly to a small box 15 containing a battery operated power supply for the photomultiplier tube, counting electronics, and a numerical display. When ionizing radiation 17 from a source 16 impinges on the scintillator crystal, it emits light which is converted into an electrical pulse by the photomultiplier tube 12 and the rate at which these pulses arrive is determined by the electronic circuit in the box 15 and displayed accordingly. As this rate is proportional to the amount of radiation present, the device can be used to monitor radiation.

A more complicated embodiment of a radiation detector is a PET camera. PET (positron emission tomography) is a medical imaging technique in which a radioactively labeled substance is administered to a patient and then traced within the patient's body by means of an instrument that detects the decay of the isotope. In PET, a chemical tracer compound having a desired biological activity or affinity for a particular organ is labeled with a radioactive isotope that decays by emitting a positron (positive electron). The emitted positron stops after traveling only a few millimeters in living tissue. It then interacts with an electron, an event that annihilates both particles. The mass of the two particles is converted into 1.02 million electron volts (1.02 MeV) of energy, divided equally between two 511 keV photons (gamma rays). The two photons are emitted simultaneously and travel in opposite directions. The two photons penetrate the surrounding tissue, exit the patient's body, and are absorbed and recorded by radiation detectors typically arranged in a number of circular arrays.

Biological activity within an organ under investigation can be assessed by tracing the source of the radiation emitted from the patient's body to the radiation detectors. The source of the radiation can be accurately estimated by linking each radiation detector with several other radiation detectors on the opposite side of the radiation detector array and registering a signal only if two detectors sense 511 keV photons within typically 10 nsec. When a coincidence is registered, an annihilation is recorded along a line connecting the two radiation detectors. In this manner, a circumferential array of radiation detectors can establish the sources of all coincident pairs of photons that originate within a volume defined by straight lines joining paired detectors. A computer program reconstructs the spatial distribution of the decaying isotopes within the patient. With suitable interpretation, PET images provide a noninvasive, regional assessment of many biochemical processes associated with human organs.

The value of PET as a clinical imaging technique is in large measure dependent upon the performance of the radiation detectors. The typical PET camera comprises an array of radiation detectors consisting of scintillator crystals coupled to photomultiplier tubes (PMT's).

When a high energy photon strikes a detector, it produces light in one of the scintillator crystals that is then sensed by the PMT, which registers the event by passing an electronic signal to the reconstruction processing circuitry.

As pointed out earlier, the scintillator crystals used in the PMT of a general purpose detector or a PET camera must have certain properties, among which are (1) good stopping power, (2) high light yield, and (3) fast decay time.

In a PET application, stopping power is the ability to stop the 511 keV photons in as little material as possible so as to reduce the overall size of the radiation detector, which reduces the cost and improves spatial accuracy. In other words, good stopping power allows for the use of more radiation detectors in a given space, and a corresponding increase in resolution. Stopping power is typically expressed as the linear attenuation coefficient (tau) having units of inverse $cm^{-1}$. After a photon beam has traveled a distance "d" in a crystal, the fraction of photons that have not been stopped by the crystal is calculated as follows:

fraction of unstopped photons = $e^{-d tau}$.

Therefore, after traveling a distance of 1/tau (the "absorption length"), approximately 37% of the photons will not have been stopped and 63% will have been stopped. Likewise, 63% of the remaining photons will have been stopped after traveling an additional distance of 1/tau. For PET, one wants 1/tau to be as small as possible so that the radiation detector is as compact as possible.

Light yield is also an important property of scintillators contemplated for use in PET. Light yield is sometimes referred to as light output or relative scintillation output, and is typically expressed as the percentage of light output from a 'standard' crystal such as thallium-doped sodium iodide. Accordingly, the light yield for NaI(Tl) is defined as 100.

A third important property of scintillators in PET applications is decay time. Scintillation decay time, sometimes referred to as the time constant or decay constant, is a measure of the duration of the light pulse emitted by a scintillator, and is typically expressed in units of nanoseconds (nsec). As noted above, in PET, the source of biological activity within an organ under investigation is determined by tracing the source of coincident photons emitted from the patient's body to the radiation detectors. When two 511 keV photons are detected at the same time by a pair of radiation detectors, the source of the photons is known to lie along the linear path connecting the two radiation detectors. In general, only a fraction of the detected photons are in coincidence and thus used in the reconstruction analysis. Moreover, many false coincidences are registered because the finite decay time associated with each scintillator may cause it to emit light at the same time as another scintillator when in fact the photons inducing the light did not come from the same positron annihilation. For example, a photon arrived at one radiation detector may produce a flash of light that does not decay, i.e. "turn off", until after a later photon, from a different positron annihilation, produces a flash of light in a detector on the side opposite the first detector. In this instance, the flashes would overlap, the radiation detectors would register them as in coincidence. Thus, scintillator materials with long decay constants have an inherent problem in detecting coincident photons. This also has an adverse effect on the resolution.

For medical reasons, the positron emitting tracer compounds should have very short half-lives. Because of the short halflives of these compounds, data on the occurrence of coincident photons needs to be gathered at as high a rate as possible. As noted above, a long decay time will lead to false coincidences, and therefore each radiation detector must be turned off for a length of time corresponding to its decay time. Since the detector is inactive for this time, it is not collecting data, and reduction of such time increases the amount of data that may be collected and thereby increases the resolution.

In addition to the three important properties discussed above, scintillator crystals for PET should be easy to handle. For example, certain known scintillators are very hygroscopic, i.e., they react with moisture, making it necessary to very tightly encapsulate them to allow their use as scintillators in PET. These hygroscopic scintillators are expensive and difficult to use.

Known scintillator materials include (1) plastic scintillators, (2) thallium-doped sodium iodide (NaI(Tl)), (3) cesium fluoride (CsF), (4) bismuth germanate ($Bi_4Ge_3O_{12}$, also referred to as "BGO"), (5) cerium fluoride ($CeF_3$), and (6) barium fluoride ($BaF_2$). Of these six scintillators, only two, BGO and $BaF_2$, are used routinely for PET.

Plastic scintillators, typically composed of polystyrene doped with a wavelength-shifting additive, are commercially available under such tradenames as PILOT U and NE 111. Upon excitation with a 511 keV photon, plastic scintillators emit a light pulse having a very fast decay constant of approximately 1.5 nsec and light output proportional to the energy of the incident photon. The main disadvantage of plastic scintillators is their low density (approximately 1.1 to 1.2 $g/cm^3$) due to the light atoms (hydrogen and carbon) that make up the molecules of the material. Because of their low density, plastic scintillators have poor stopping power, and are therefore poorly suited for use in PET.

NaI(Tl), thallium-doped sodium iodide, has the highest light output of the six scintillators listed above. NaI(Tl) also has reasonably good stopping power (1/tau=3.0 cm at 511 keV). However, NaI(Tl) has a long decay constant (250 nsec), a significant disadvantage for use in PET. NaI(Tl) has an additional disadvantage in that it is highly hygroscopic, making it extremely difficult to handle in that it must be tightly encapsulated in bulky cans.

CsF, cesium fluoride, has an advantage over plastic scintillators because of its relatively high density (4.61 $g/cm^3$) and consequent stopping power. However, the light output and decay constant of CsF are inferior to those of plastic scintillators. CsF is also highly hygroscopic, well above NaI(Tl) which, as noted above, makes it expensive and difficult to handle.

BGO has the highest density (7.13 g/cm) of the six known scintillator materials noted above. Its stopping power is the best of the six materials (1/tau=1.1 cm at 511 keV). As a result, BGO is best able to absorb 511 keV photons efficiently in small crystals. However, BGO's very long decay constant (300 nsec), longer even than NaI(Tl), is at a significant disadvantage for use in PET.

The use of $BaF_2$ as a scintillator material is described in Allemand et al. U.S. Pat. No. 4,510,394. $BaF_2$ emits light having two components: 75% is emitted with a 'slow' decay constant of approximately 620 nsec and 25% with a 'fast' decay constant of approximately 0.6 nsec. $BaF_2$ has a light yield of approximately 16% that of NaI(Tl) and about half the stopping power of BGO (1/tau=2.3 cm at 511 keV). Unlike CsF and NaI(Tl), $BaF_2$ is not hygroscopic.

The fast component of $BaF_2$ emits light in the ultraviolet region of the spectrum. Glass photomultiplier tubes are not transparent to ultraviolet light, so a quartz photomultiplier tube must be used instead to detect the fast component of $BaF_2$. Since quartz photomultiplier tubes are substantially more expensive than glass, one would prefer to avoid using $BaF_2$, if possible, in favor of using a scintillator that can be detected by a glass photomultiplier tube. The fast component gives $BaF_2$ very good timing resolution, but the slow component limits its high rate capabilities. In other words, it takes longer when using $BaF_2$ to get ready for the next event.

Cerium fluoride is a relatively new scintillator material which has an excellent balance of properties. In comparison to NaI(Tl), it has a much better stopping power (1/tau=1.9 cm instead of 3.0 cm), and its decay constant is almost ten times faster. The light yield is much lower (4 as compared to 100), but it is still sufficiently large to be useful.

Of the best known scintillator materials, BGO has the best stopping power, NaI(Tl) has the best light yield, and $BaF_2$ has the best timing resolution. However, as noted above, each of these materials have significant shortcomings which hinder their performance as scintillators for PET: BGO has a very long decay constant, NaI(Tl) has a very long decay constant and is hygroscopic, and $BaF_2$ has a long decay constant and requires expensive photomultiplier tubes. $CeF_3$ provides good stopping power and good timing resolution, but since it was discovered little more than one year ago, it has yet to be incorporated in many radiation detectors and so its full potential is not yet known.

OBJECTS OF THE INVENTION

It is therefore an object of the invention to provide an improved radiation detector having an improved scintillator material.

Another object of the invention is to provide a radiation detector element having enhanced utility for general purpose detection and in PET.

A further object of the invention is to provide a radiation detector containing a scintillator material having a superior balance of stopping power, light yield and decay constant.

A still further object of the invention is to provide a radiation detector having a scintillator with good properties and which is easily fabricated from naturally available materials.

SUMMARY OF THE INVENTION

The above and other objects are obtained by utilizing a crystalline mixture consisting essentially of from about 25% to about 99.5% lanthanum fluoride and from about 0.5% to about 75% cerium fluoride as a scintillator material. In its preferred range the mixture will consist essentially of from 50% to 99% lanthanum fluoride with the remainder being cerium fluoride and optimum results are obtained at about 90% lanthanum fluoride and 10% cerium fluoride.

Specifically, cerium fluoride has been found to provide a balance of stopping power, light yield, decay constant, and ease of fabrication that is superior to presently known scintillator materials. Lanthanum fluoride is not a good scintillator, but it improved the scintillating properties of cerium fluoride by reducing the decay time without significantly affecting the other scintillation properties. As a result, crystalline mixtures of $LaF_3$ and $CeF_3$ are favorably suited for use as a scintillator material for general purpose radiation detectors and in positron emission tomography.

DETAILED DESCRIPTION OF THE PREFERRED EMBODIMENTS

Figure 1:
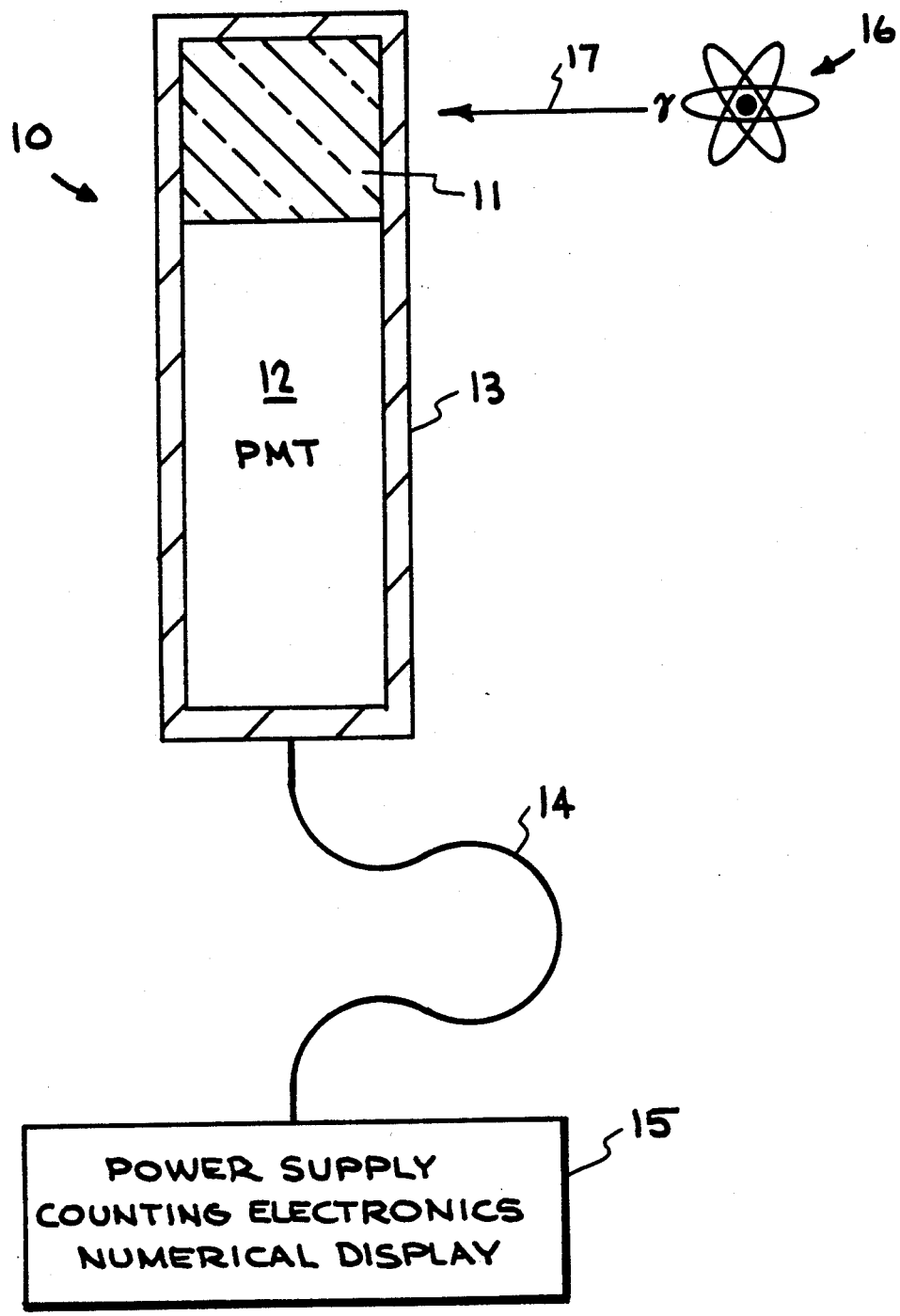
FIG. 1 is a schematic diagram of a general purpose high energy radiation detector device.

As already described above, FIG. 1 schematically illustrates a general purpose radiation detector 10 in which a scintillator crystal 11 is coupled to photomultiplier tube 12. The photomultiplier tube 12 is coupled by cable wire 14 to conventional analog electronics assembly 15 which can amplify, discriminate and count incoming signals.

Figure 2:
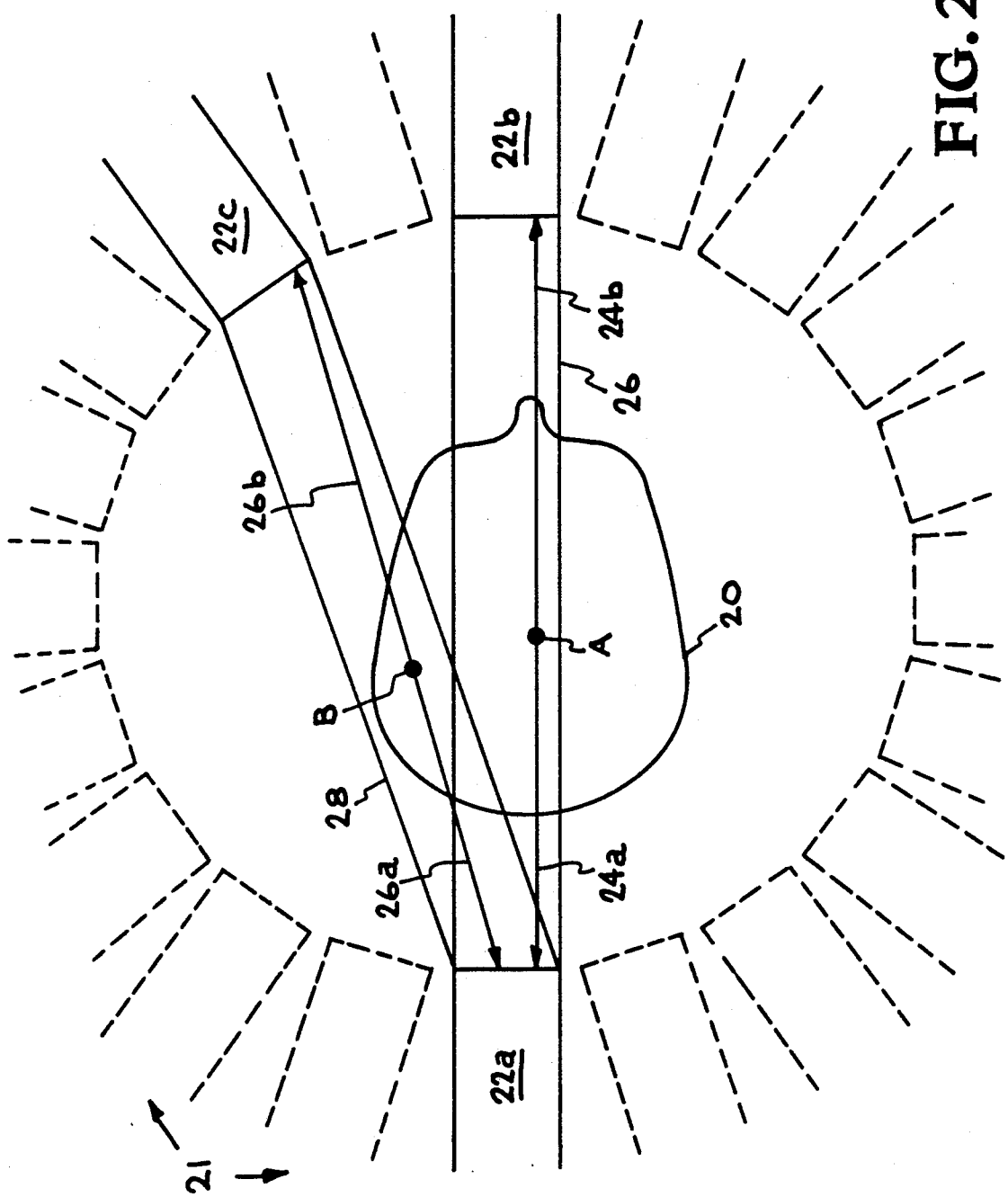
FIG. 2 is a schematic diagram showing the basic mechanism of positron emission tomography in combination with a circular array of detectors.

Turning to FIG. 2 of the drawing, an object 20, such as, for example, a section of a human brain, is shown in cross-section for study using PET. Object 20 is placed between two arrays of oppositely disposed photodetectors in circular array 21 of photodetectors, three of which are illustrated for simplicity in the figure as detectors 22a, 22b, and 22c. A radioactively labeled substance having an affinity for object 20 is administered to the patient. The substance decays by emitting a positron (not illustrated), which slows and interacts with electrons (not illustrated) in the tissue of object 20. This positron/electron interaction causes the annihilation of both particles at point A in FIG. 2, producing two 511 keV photons, illustrated as rays 24a and 24b, which are emitted approximately 180 degrees to each other. If rays 24a and 24b are detected simultaneously (in the coincidence) by detectors 22a and 22b, then the decay is localized to the space between detectors 22a and 22b.

Positron/electron annihilation occurring elsewhere in the patient such as at point B will be detected by another pair of photodetectors. Thus, if rays 26a in FIG. 2 are detected simultaneously by detectors 22a and 22c, the decay is localized to the space 18 between detectors 22a and 22c. In this manner, the source of photons emitted from within object 20 can be accurately established.

It is to be appreciated that the ring or circular array 21 of detectors 22a, 22b, 22c, etc., are used to localize the source of coincident 511 keV photons. Detectors 22a, 22b, 22c, etc., are arranged so that only simultaneous events occurring on the opposite side of ring 21 are recorded. For example, an annihilation at point A will produce two 511 keV photons, illustrated as rays 24a and 24b. If rays 24a and 24b are detected simultaneously by the two detectors, 22a and 22b, the event is recorded. A computer program reconstructs the spatial distribution of the decaying isotopes within the patient by back-projecting the recordings of simultaneous events by detectors located on nearly opposite sides of the ring.

A scintillator crystal comprising substantially pure $CeF_3$ has been found to possess particularly favorable stopping power, light yield and decay constant for use as a scintillator material in PET camera arrays such as that illustrated in FIG. 2. The relevent properties of $CeF_3$ are compared to those of known scintillator materials in Table I below.

TABLE I

|  | $CeF_3$ | NaI(T1) | $BaF_2$ | BGO |
|---|---|---|---|---|
| Decay Constant (nsec) | 27 | 250 | 0.6/620 | 300 |
| Light Yield | 4 | 100 | 16 | 8 |
| 1/tau (cm 511 keV) | 1.9 | 3.0 | 2.3 | 1.1 |
| Hygroscopic | No | Very | Slightly | No |

The use of $CeF_3$ as a scintillator was independently discovered by D. F. Anderson of Fermi National Laboratory and by the inventor herein of the Lawrence Berkeley Laboratory. D. F. Anderson has published his work in the IEEE transactions of Nuclear Science, Vol. 36, No. 1, February 1989. In his article, D. F. Anderson has reported both a fast and a slow light output component for $CeF_3$. However, the present inventor, who also presented results on $CeF_3$ in the same issue of IEEE Trans. Nucl. Sci., did not observe the fast component. The present inventor has repeatedly tested his sample, including a recalibration of his equipment, and he has found no fast component in his samples of pure $CeF_3$. These results were shown in Table I above.

It is very difficult to purify $CeF_3$, because it occurs along with other rare earths and separations are very difficult. In fact, the major impurity in $CeF_3$ is $LaF_3$, and one of the important features of the present invention resides in the fact that the $LaF_3$ need not be removed from the $CeF_3$ to be used, and the $CeF_3$ need not be removed from the $LaF_3$ to be used in the desired crystal mixture. Accordingly, the differences in reported results could be due to very small amounts of rare earth impurities in the samples tested.

It is not understood how mixtures of rare earth fluorides effect scintillation. For example, since pure $LaF_3$ provides substantially no visible light output from gamma radiation, it was unexpected to find that large percentages of fast components were obtained from 511 KeV gamma radiation by mixtures of $CeF_3$ and $LaF_3$. In addition, it was found that mixtures containing only 10% of $CeF_3$ provided a light output of 90% of that provided by pure $CeF_3$. These results and other characteristics of the mixtures are given in Table II below. The light output was based on a standard of 100 for $CeF_3$.

TABLE II

| Material | Light Output | Fast Output | Slow Component |
|---|---|---|---|
| pure $CeF_3$ | 100 | 0 | 100% @ 27 ns |
| 50% $LaF_3$ - 50% $CeF_3$ | 50 | 34% @ 10 ns | 66% @ 30 ns |
| 90% $LaF_3$ - 10% $CeF_3$ | 90 | 66% @ 18 ns | 34% @ 39 ns |
| 99% $LaF_3$ - 1% $CeF_3$ | 50 | 100% @ 18 ns | 0 |
| 99.99% $LaF_3$ - 0.01% $CeF_3$ | 1 | — | — |

As shown in Table I above $CeF_3$ has a good balance of properties for use as a scintillator, and in particular for a scintillator to be used in PET. In particular $CeF_3$ is not hygroscopic, does not require a quartz window, and has good stopping power. Accordingly, its relatively low light output is offset by these advantages. Moreover, present systems are capable of reliable operations at these light output levels, and for PET, only the difference between detection and non-detection is required.

From Table II above, it is seen that the mixtures of $CeF_3$ and $LaF_3$ compare very well with $CeF_3$, and allow a choice in the balance of properties. In particular, the effective decay time can be reduced significantly with only a slight reduction in light output. It should also be mentioned that the stopping power 1/tau is 1.9 for all mixtures of $CeF_3$ and $LaF_3$. In addition, these materials occur naturally mixed, and providing a crystal mixture is advantageous from a processing standpoint. Rather than use high purity (with correspondingly high costs) starting materials, these scintillation crystals can be made by mixing in the desired proportions of $CeF_3$ powder, which contains small impurities of $LaF_3$ with $LaF_3$ powder which contains small amounts of $CeF_3$ melting them together and forming it into the desired mixed crystals.

While particular embodiments and applications of the present invention have been shown, it will be understood, of course, that the invention is not limited thereto since modifications may be made by those skilled in the art, particularly in light of the foregoing teachings. It is therefore contemplated by the appended claims to cover any such modifications as incorporate those features which come within the true spirit and scope of the invention.

What is claimed is:

1. A radiation detection device comprising:
   (a) a scintillator consisting essentially of a crystalline mixture of $LaF_3$ and $CeF_3$ wherein the amounts of $LaF_3$ is from about 25% to about 99.5% and the $CeF_3$ is from about 0.5% to about 75%; and
   (b) means connected to the scintillator for converting scintillating light into an electrical pulse.

2. The radiation detection of claim 1 wherein said scintillator crystal is responsive to ionizing radiation.

3. The scintillator of claim 2 wherein said scintillator crystal is responsive to gamma rays.

4. The radiation detector of claim 1 wherein the scintillator element consists essentially of 50 to 99% $LaF_3$ and 1 to 50% of $CeF_3$.

5. A radioisotope camera comprising:
   (a) a plurality of scintillator elements capable of converting gamma radiation to optical radiation consisting essentially of a crystalline mixture of $LaF_3$ and $CeF_3$ wherein the amount of $LaF_3$ is from about 25% to 99.5% and the amount of $CeF_3$ is from about 0.5% to 75%, each scintillator element being arranged in close proximity to each other and positioned to receive gamma radiation from a subject;
   (b) a plurality of photodetectors positioned to receive optical radiation directly from the scintillator elements and convert the optical radiation into electrical pulses; and
   (c) means connected to the photodetectors for responding to the electrical pulses generated by the photodetector elements and reconstructing the spatial distribution of gamma radiation from the subject.

6. The radioisotope camera of claim 5 wherein each photodetector comprises a photomultiplier tube coupled to a scintillator element.

7. The radioisotope camera of claim 5 wherein each photodetector comprises a solid-state photodiode coupled to a scintillator element.

8. The radioisotope camera of claim 5 wherein said scintillator elements consist essentially of a crystalline mixture containing from about 50% to 99% $LaF_3$ and from about 1% to 50% $CeF_3$.

9. The radioisotope camera of claim 5 wherein the scintillator elements are in a circular array configuration and comprise means for detecting positron emission.

10. The method of detecting non-optical radiation comprising:
    (a) providing a radiation detector comprising (i) a scintillator crystal element composed of a mixture of from about 25% to 99.5% $LaF_3$ and from about 0.5% to 75% $CeF_3$, and (ii) a photodetector positioned to receive optical radiation directly from the scintillator element and convert it into an electrical pulse;
    (b) exposing the scintillator element to non-optical radiation; and
    (c) measuring the electrical pulses generated by photodetector.

11. The method of claim 10 wherein said non-optical radiation is ionizing radiation in the form of high energy photons.

12. The method of measuring the position of gamma radiation from a subject comprising:
    (a) providing a radiation detector comprising (i) a plurality of scintillator elements capable of converting gamma radiation to optical radiation composed of a crystalline mixture of from 25% to 99.5% $LaF_3$ and from 0.5% to 75% $CeF_3$, (ii) a plurality of photodetectors positioned to receive optical radiation directly from the scintillator elements and convert it into electrical pulses and (iii) means connected to the photodetectors for responding to the electrical pulses generated by the photodetectors and reconstructing the spatial distribution of gamma radiation from the subject;
    (b) exposing the scintillator elements to radioactive emissions; and
    (c) reconstructing the spatial distribution of the radioactive emissions from the electrical pulses generated by the photodetector.

13. The method of claim 12 wherein said radiation is high energy radiation in the form of high energy photons.

14. The method of claim 12 wherein the scintillator elements of the radiation detector are in a circular array configuration and disposed around a radioactive emitting subject whereby the reconstructing step results in a position emission tomograph.

* * * * *